United States Patent Office 3,014,055
Patented Dec. 19, 1961

3,014,055
WATER SOLUBLE COMPLEXES OF ALUMINA
Carl E. Johnson, Glen Ellyn, Ill., assignor to Nalco Chemical Company, a corporation of Delaware
No Drawing. Filed Dec. 15, 1958, Ser. No. 780,206
6 Claims. (Cl. 260—448)

This invention relates to water soluble complexes of alumina. Specifically, the invention relates to the method of preparing water soluble complexes of alumina from sodium aluminate.

In many instances, it is desirable to prepare water soluble aluminum compounds or complexes which are stable under slightly alkaline or mildly acidic conditions. The most commonly used method of preparing materials of this type is to react an acidic aluminum salt such as aluminum chloride with acidic organic materials such as, for instance, carboxylic acids to form aluminum soaps. This process usually requires expensive ingredients. When such preparations are used to formulate products such as salves, ointments, or antiperspirant mixtures, it is necessary to remove excess acid formed in the reaction and to adjust the pH of the final product to limits that are not harmful to the various parts of the body to which such preparations are applied.

In accordance with the invention, it has been found that water soluble complexes of alumina may be conveniently prepared by reacting aqueous solutions of sodium aluminate which contain relatively large quantities of stabilizing compounds with a water soluble lower acyclic carboxylic acid in an amount sufficient to adjust the pH of the sodium aluminate solution to not more than 10, and then heating the treated solution to a temperature of at least 100° F. for a period of time sufficient to produce a clear solution.

The sodium aluminate used to prepare the complexes of the invention should be of a relatively pure nature and should not contain more than 0.1% of such materials as iron, calcium, magnesium, silica, or heavy metals. It is also desirable to use a sodium aluminate which has the smallest quantity of sodium oxide present in relation to the amount of alumina present. Therefore, while sodium aluminates may be used having a molar ratio of $Na_2O$ to $Al_2O_3$ ranging from approximately 1:1 to as high as 1.5:1, it is preferred to use a product having a molar ratio between 1.1:1 and 1.15:1.

Sodium aluminate, when produced by most methods, such as caustic-alumina fushion techniques, will form aqueous solutions which have a very short shelf life and tend to throw out alumina after standing for extremely short periods of time. This problem of alumina precipitation may be readily overcome by treating the sodium aluminate with certain water soluble organic polyhydroxy stabilizing compounds. When aluminates are treated with such stabilizing compounds, they may be made up into solutions having concentrations as great as 44% with no evidence of alumina precipitation being found even after standing for several days.

Sodium aluminates having low amounts of excess sodium oxide to $Al_2O_3$, and containing stabilizers of the type mentioned above, are described at length in Lindsay et al. U.S. Patent 2,345,134, the disclosure of which is incorporated herein by reference. For the practice of this invention, it is desirable to use sodium aluminates of the type described in this patent. A typical commercial sodium aluminate which is admirably suited to the practices of this invention is the product Nalco 680, which has the following characteristics:

| | |
|---|---|
| Color | White. |
| Odor | None. |
| Maximum solubility at 75° F. | 80 parts in 100 parts water. |
| Density | 50 lbs/cu. ft. |
| Insoluble | Less than 0.2%. |
| $Na_2O:Al_2O_3$ molecular ratio | 1.15:1. |
| $Al_2O_3$, percent | 46.0. |
| $Na_2O$, percent | 31.0. |
| Fe, percent | 0.01. |
| Ca and Mg, percent | Negative. |
| Si, percent | 0.02. |
| Heavy metals, percent | Negative. |
| As, percent | Negative. |

The product may be further characterized by the formula $Na_2O \cdot Al_2O_3 \cdot 3H_2O$.

In order to prepare the complexes of the invention, it is necessary to treat the sodium aluminate either before or after its dissolution in water with large quantities of water soluble organic polyhydroxy stabilizing compounds. The amounts required are from 7% to 35% by weight of the water soluble polyhydroxy stabilizing compound, and preferably 20% to 30% by weight. It will be understood that these percentages are based on the weight of the sodium aluminate. The amount of stabilizer in the solution prior to acid treatment will be at least 0.7% by weight and preferably 1% to 15.4% by weight.

The water soluble organic polyhydroxy stabilizing compounds may be selected from a large number of organic materials and include such compounds as tartaric acid and its water soluble salts, gluconic acid and its water soluble salts, gallic acid and its water soluble salts, invert sugar, glucose, sorbitol, degraded water soluble starches, and $a$-gluco-sodium heptonate. Many of these materials are described in Lindsay et al., U.S. Patent 2,345,134 as being stabilizers for sodium aluminate. The most useful stabilizer is sorbitol.

To make the alumina complexes of the invention, it is necessary to use aqueous solutions of the sodium aluminate and the stabilizer which have pH's in excess of 10.5. It is therefore necessary to have the solutions contain at least 1% by weight of sodium aluminate and, due to the economic factors, it is desirable that the solution contain between 10% and 44% by weight of sodium aluminate.

To produce the complexes of the invention, all that is required is to treat the stabilized sodium aluminate solutions described above with a water soluble lower acyclic carboxylic acid in an amount sufficient to adjust the pH to not greater than 10. In a preferred embodiment, the pH is adjusted by adding an acid of the type described in an amount to lower the pH to between 4.5 and 10; and, where it is desired to make a product such as an antiperspirant, the pH may be adjusted to between 7.0 and 9.5. Since 10% solutions of sodium aluminate have pH's in excess of 11, the neutralization with carboxylic acid also will neutralize any free sodium hydroxide contained in the solution. The acids used may be selected from a wide variety of carboxylic acids, but is preferred to use the water soluble carboxylic acids containing six carbon atoms or less. The following is an illustrative list of acids that may be used.

CARBOXYLIC ACIDS

| | |
|---|---|
| Formic | Glycolic |
| Acetic | Lactic |
| Propionic | Methoxyacetic |
| n-Butyric | Cyanoacetic |
| Glyoxylic | Malonic |
| Fluoroacetic | Acrylic |
| Chloroacetic | Vinylacetic |
| Bromoacetic | Malic |
| Iodoacetic | Tartaric |
| Dichloroacetic | Citric |
| Trichloroacetic | Gluconic |
| a-Chloropropionic | β-Chloropropionic |

Upon addition of an amount of acid sufficient to adjust the pH to the desired level, the aluminate solution tends to form a flocculant precipitate. This precipitate is readily caused to enter into a reaction by heating the treated solution to a temperature of at least 100° F. and preferably 180° F. to 200° F. for a period of time sufficient to produce a clear, homogeneous solution. The time of heating will vary from several minutes to several hours, depending upon the type of sodium aluminate used, the type and quantity of stabilizer, the particular acid, and the pH level. As a general rule, products containing the relatively large amounts of stabilizer or having the lowest pH will form the complexes more readily than those containing minimum amounts of stabilizer and having high pH's. In order to more fully illustrate the invention, the following are given by way of example.

Example I 21.8 grams of sodium aluminate having an $$Na_2O:Al_2O_3$$

molar ratio of 1.15:1 were dissolved in 80 grams of water in a laboratory flask. 5 grams of sorbitol were added and stirred to form a homogeneous solution. 31.6 grams of 90% formic acid were added dropwise until a pH of 4.0 to 5.0 was reached. A flocculant precipitate was noted. The mixture was heated over a steam cone for one hour, at which time a water clear solution resulted.

Example I-A

The same as Example I except that no stabilizer was added. A flocculant precipitate formed as the pH dropped below 10.5. Prolonged heating did not redisperse this precipitate.

Example II

The following ingredients were added to a laboratory flask: 21.8 grams of sodium aluminate, having the molar ratio of Example I, 80 ml. of water, and 18.6 grams of sorbitol. A clear solution resulted. 30.3 grams of lactic acid were added drop-wise until a pH of 7.0 was reached as indicated by a universal indicating paper. A small precipitate was noted, which redissolved after stirring and heating over a steam cone for one-half hour. The resultant product was a pale yellow liquid.

Example III 120 grams of sodium aluminate, having the molar ratio of Example I, and 40 grams of sorbitol were mixed together; the resultant product was a solid. 15 grams of this solid were weighed in a laboratory flask, to which was added 35 grams of water. The contents of the flask were then heated over a steam cone in a standard laboratory setup for 3 to 4 minutes, at which time the solid was dissolved. Lactic acid, 14.8 grams, was then added drop-wise until a pH of 8.0 was reached, as indicated by a universal indicating paper. The first addition of lactic acid caused some precipitation; further additions of the acid and heating on a steam cone for 3 minutes dissolved the floc. The resultant product was a clear liquid with a slight yellow cast.

Example IV 21.8 grams of sodium aluminate, having the molar ratio of Example I, 45.39 grams of water, and 1.6 grams of sorbitol were mixed together in a laboratory flask. 40.9 grams of formic acid was then added drop-wise until a pH of 4 was reached. This mixture was then heated over a steam cone for one hour. The resultant product was a clear, water white liquid.

The compositions described above may be generically set forth in accordance with the following:

Ingredients: Per cent by weight
(A) $Al_2O_3$ -------------------------- .46–20
(B) Water soluble organic polyhydroxy stabilizing compound ---------------- 0.7–15.4
(C) A water soluble lower acyclic carboxylic acid of not more than 6 carbon atoms in chain length in an amount sufficient to produce a pH of an aqueous system containing the above within the range of 4.5 to 10.

As indicated, the preferred compositions of the type shown above have as their stabilizing material sorbitol, and the water soluble acids used are such acids as formic or acetic. The pH is preferably within the range of 7 to 9.5.

The compositions of the invention are useful in preparing various types of ointments, anti-perspirants, blood coagulants, and the like. They also have usefulness in such fields of industrial application as dye mordanting, catalyst preparation, and in the treatment of textiles to furnish water-proof coatings.

The invention is hereby claimed as follows:

1. The process of preparing water soluble complexes of alumina from sodium aluminate which comprises treating an aqueous solution of sodium aluminate, which contains from 7% to 35% by weight, based on the weight of the sodium aluminate, of a water soluble, organic polyhydroxy stabilizing compound, of not more than 7 carbon atoms with a water soluble, lower acyclic carboxylic acid of not more than 6 carbon atoms in chain lengths in an amount sufficient to neutralize the sodium present and to adjust the pH to not more than 10, and then heating the reactants to a temperature of between 100° F. and 200° F. for a period of time sufficient to produce a clear solution.

2. The process of preparing water soluble complexes of alumina from sodium aluminate which comprises treating an aqueous solution of sodium aluminate, which contains from 20% to 35% by weight, based on the weight of the sodium aluminate, of a water soluble organic polyhydroxy stabilizing compound from the group consisting of tartaric acid and its salts, gluconic acid and its salts, gallic acid and its salts, invert sugar, glucose, sorbitol, degraded starch, and a-glucoheptonate, with a water soluble lower acyclic carboxylic acid of not more than 6 carbon atoms in chain length in an amount sufficient to neutralize the sodium present and to adjust the pH to between 4.5 and 10, and then heating the reactants to a temperature between 180° F. and 200° F. for a period of time sufficient to produce a clear solution.

3. The process of preparing water soluble complexes of alumina from sodium aluminate which comprises treating an aqueous solution containing from 10% to 44% of sodium aluminate and from 0.7% to 15.4% by weight of sorbitol with a water soluble lower acyclic carboxylic acid of not more than 6 carbon atoms in chain length in an amount sufficient to adjust the pH to between 7 and 9.5, and then heating the reactants to a temperature between 180° F. and 200° F. for a period of time sufficient to produce a clear solution.

4. The process of claim 3 where the water soluble lower acyclic carboxylic acid is formic acid.

5. A water soluble complex of alumina having the following composition:

| Ingredients: | Per cent by weight |
|---|---|
| (A) $Al_2O_3$ | .46–20 |
| (B) Water soluble organic polyhydroxy stabilizing compound of not more than 7 carbon atoms | 0.7–15.4 |
| (C) A water soluble lower acyclic carboxylic acid of not more than 6 carbon atoms in chain length in an amount sufficient to produce a pH of an aqueous system containing the above within the range of 4.5 to 10. | |

6. The water soluble complex of alumina of claim 5 where the water soluble organic polyhydroxy stabilizing compound is sorbitol, the water soluble lower acyclic carboxylic acid is from the group consisting of formic and acetic acid, and the pH of the system is within the range of 7 to 9.5.

References Cited in the file of this patent

UNITED STATES PATENTS

| 2,086,499 | Hennig | July 6, 1937 |
| 2,345,134 | Lindsay | Mar. 28, 1944 |
| 2,595,416 | Schmerling | May 6, 1952 |